United States Patent [19]

Lehmann

[11] 4,337,000
[45] Jun. 29, 1982

[54] TWO-SPINDLE PLANETARY KITCHEN MIXER-KNEADER AND ANTI-CLIMB DOUGH HOOKS THEREFOR

[76] Inventor: Herbert G. Lehmann, 5 Kent Rd., Easton, Conn. 06612

[21] Appl. No.: 270,401

[22] Filed: Jun. 4, 1981

[51] Int. Cl.³ .............................. B01F 9/22; B01F 7/16
[52] U.S. Cl. .................................... 366/288; 366/329; 366/343
[58] Field of Search ............... 366/288, 287, 343, 344, 366/97, 98, 69, 70, 99, 297, 298, 300, 299, 301, 325, 327, 329, 279

[56] References Cited

U.S. PATENT DOCUMENTS

| | | | |
|---|---|---|---|
| 374,706 | 12/1887 | Rosenkranz | 366/288 |
| 1,766,942 | 6/1930 | Rataiczak | 366/288 |
| 1,826,242 | 10/1931 | Dehuff | 366/343 |
| 3,169,395 | 2/1965 | Enoch | 366/325 |
| 4,079,917 | 3/1978 | Popeil | 366/288 |

FOREIGN PATENT DOCUMENTS 19180 2/1907 United Kingdom ................ 366/288

*Primary Examiner*—Robert W. Jenkins
*Attorney, Agent, or Firm*—H. Gibner Lehmann; K. Gibner Lehmann

[57] ABSTRACT

A planetary-type kitchen mixer-kneader having two spindles both of which turn in the same direction and travel in identical circular orbits as they sweep in an orbital path along the inside wall surfaces of the mixing bowl. The spindles are adapted to carry wire whips, flat beaters, and dough hooks, the latter in pairs which cooperate by means of their shapes and deflector blades, to simultaneously mix and work the dough and retain it low in the bowl.

9 Claims, 9 Drawing Figures

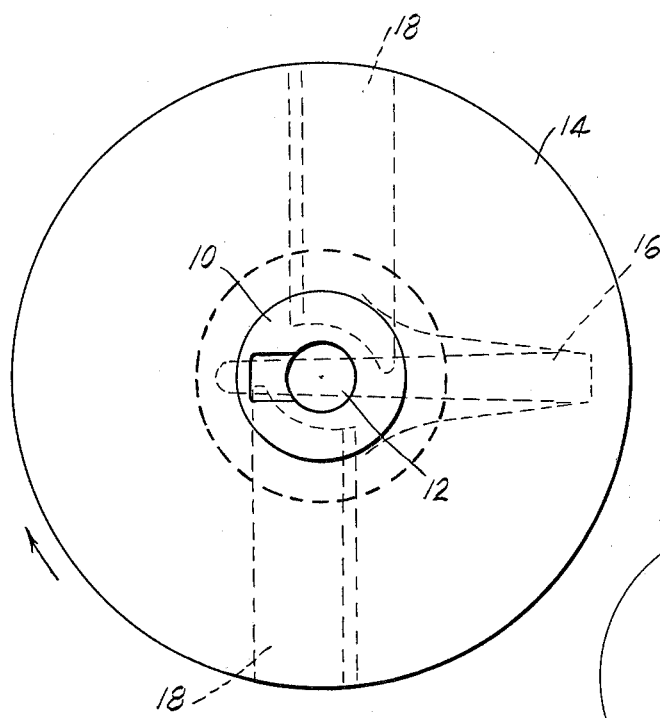
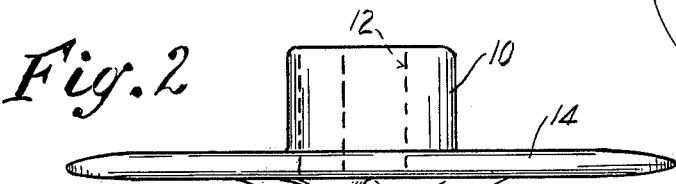
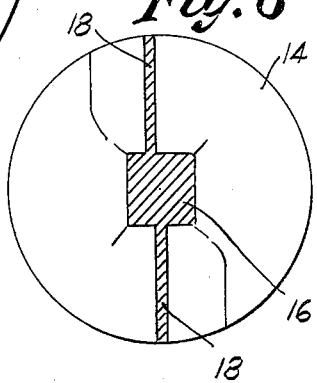
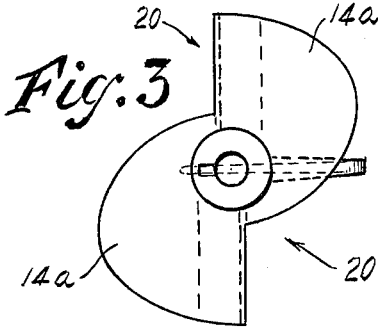
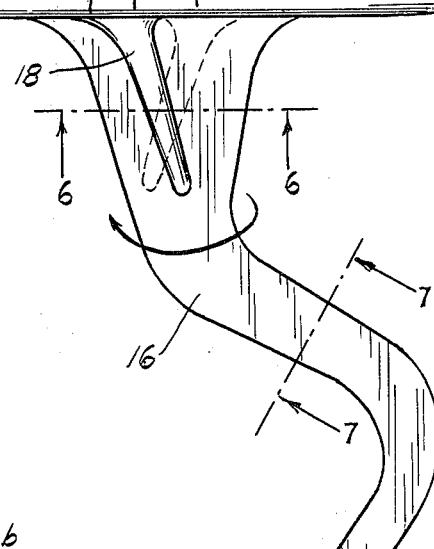
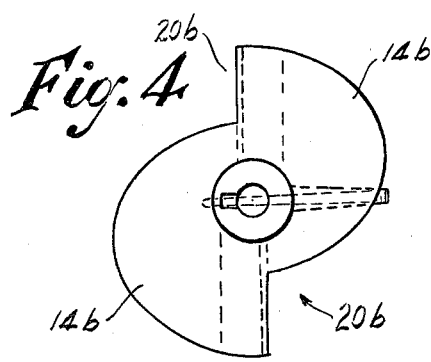

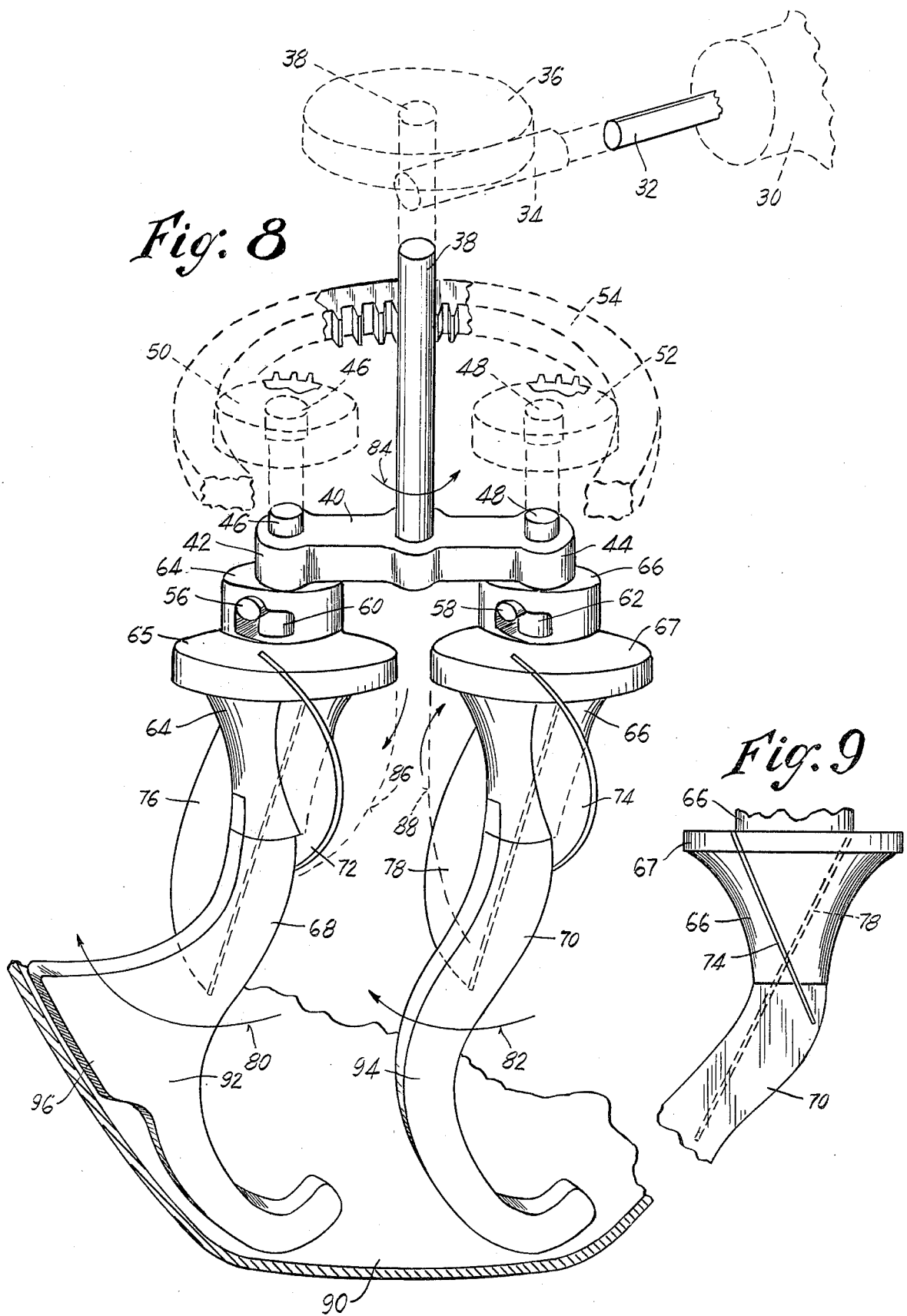

4,337,000

TWO-SPINDLE PLANETARY KITCHEN MIXER-KNEADER AND ANTI-CLIMB DOUGH HOOKS THEREFOR

BACKGROUND

This invention relates to electric mixers and beaters for the kitchen, and more particularly to planetary-type mixers which are equipped with one or more dough hooks and are especially intended to mix and knead dough for bread, cakes etc.

A prior type of planetary kitchen mixer which has been in widespread use, has comprised a single spindle adapted to carry either a flat beater, a wire whip or else a dough hook. The spindle is carried on a rotary head in a way that it traverses an orbital path in the mixing bowl. Thus, the spindle turns about one vertical axis in the head in one direction as the head turns about another vertical axis in the opposite direction. The arrangement is such that the attachments or implements for the spindle not only have rotary movement but also traverse and gyrate along the inner surface of the bowl while having such movement.

A difficulty with this type of prior arrangement is that the dough tends to climb up on the dough hook during the mixing and kneading. To counteract this, the dough hooks are provided with large circular flanges at their top or hub portions, which are intended to act as a stop or wall, restricting the upward movement of the dough. These flanges work satisfactorily for smaller batches of dough but are ineffective when the mixer is used to make larger batches, as for example amounts sufficient to provide for three loaves of bread at 1⅛ lb. each.

Another disadvantage of this prior planetary mixer is that the single dough hook is often inadequate to quickly and thoroughly mix the various ingrediants of the dough, or to intermix two previously-mixed sponges of dough. In consequence, the mixing operation takes longer and requires more attention on the part of the housewife. Additionally, the round cross sections of the hook make it more difficult to scrape off the dough, especially if a blade is to be used.

SUMMARY

The above drawbacks and disadvantages of this prior planetary mixer and the dough hooks therefor are obviated by the present invention, which has for one object the provision of an improved, planetary kitchen mixer-kneader which does a quicker and better mixing and kneading job, and which also obviates the necessity for providing large, obstruction flanges on the dough hooks to prevent the climbing of dough.

Another object of the invention is to provide an improved, simplified planetary kitchen mixer-kneader as above set forth, characterized by two spindles carried by the rotary head, both spindles traveling in the same directions in the head as the latter rotates, thereby to furnish a cooperable re-action of the two dough hooks and the bowl as compared with the single interaction of one dough hook with the bowl, all for the purpose of improving the mixing and kneading capability.

A further object of the invention is to provide an improved planetary kitchen mixer-kneader of the two-spindle like-rotation type, wherein dough-depressing blades on the dough hooks coact with each other as the hooks rotate, thereby to effectively keep the dough from climbing and in the lower portions of the mixing bowl.

Yet another object of the invention is to provide an improved planetary-type kitchen mixer-kneader having two spindles, wherein an especially simple drive mechanism is utilized for the spindles to effect the simultaneous, like-direction movement or turning of the same.

Still another object of the invention is to provide a novel and improved dough hook for a kitchen mixer, having simple, effective means which prevents the dough from climbing up, when large batches are being mixed.

A further object of the invention is to provide an improved dough hook as above set forth, wherein the scraping-off of the dough is facilitated as by making the cross-section of the hook of polygonal configuration so as to present flat surfaces to a scraper blade.

Still another object of the invention is to provide an improved dough hook as above characterized, which can be easily and quickly cast in simple molds and economically fabricated.

A feature of the invention resides in the provision of an improved dough hook as above outlined, wherein simplified angular blades can replace the interceptor or obstructing flange of prior devices and can have a positive downward-shifting action on the dough, to prevent its climbing and at the same time to effect a kneading action.

Another feature of the invention resides in the safety structures by which improper use of the mixer-kneader is prevented.

The above objects are accomplished by the provision of a rotary head carried by a vertically-disposed spindle which is powered through a suitable geartrain from an electric motor. The rotary head has a pair of oppositely-disposed bearings in which two spindles are respectively journaled. At their upper ends, the spindles carry pinions which respectively mesh with the internal teeth of a ring gear which is rigidly mounted to be stationary on the frame of the mixer. As the rotary head is driven in its turning movement, the pinions travel along the inner teeth of the ring gear and impart turning movement to the spindles carried by the head. At their lower ends, the spindles have drive means cooperable with various attachments or implements, such as dough hooks which are intended to mix and knead the dough in the bowl. In place of the two cooperable dough hooks, a single large flat beater attachment could be carried by one spindle with the other spindle being left unused. Or, a spiral wire whip could be carried by one spindle, with the other spindle left unused. If the large flat beater has a circular anti-climb flange at its hub which when mounted extends to but does not touch the other spindle, such flange will prevent any other attachment from being improperly applied to said other spindle, which could otherwise cause damage to the machine. If the shoulder portions of the elements of the wire whip are likewise sufficiently raised and extended to reach close to the other spindle from the one carrying the whip, and if they are spirally disposed, these will prevent said other spindle from being used to carry another attachment which could interfere with or damage the wire whip. Thus, safety features can be incorporated in the attachments for the spindles, to prevent improper use of or damage to the machine.

The above objects are also accomplished by the provision of a hub and a depending dough hook, wherein the cross-section of the hook is polygonal, as for example with a square configuration that provides four flat or partially flat sides representing large surfaces each of which can be quickly and easily scraped with single strokes of a knife or blade. On opposite sides of the hook there are angularly-disposed blades which slope in such a manner that they force the dough in a downward direction as it is being worked by the hook, and at the same time aid in the manipulation or kneading of the dough.

The angular blades can depend from a flange surface which can be either circular or else of butterfly shape, co-acting with the blades to minimize the likelihood of the dough climbing up over the latter.

Other features and advantages will hereinafter appear.

In the accompanying drawings, illustrating several embodiments of the invention:

FIG. 1 is a top plan view of a dough hook with a circular flange and angular blades, and with a square cross section in the hook, as provided by the invention.

FIG. 2 is a side elevational view of the dough hook of FIG. 1.

FIG. 3 is a top plan view on a reduced scale, of a dough hook representing another embodiment of the invention.

FIG. 4 is a top plan view of a dough hook representing still another embodiment of the invention.

FIG. 5 is a top plan view of a dough hook representing yet another embodiment of the invention.

FIG. 6 is a horizontal section taken on the line 6—6 of FIG. 2.

FIG. 7 is a section taken on the line 7—7 of FIG. 2.

FIG. 8 is a diagrammatic, perspective view of the working mechanism of a two-spindle planetary mixer-kneader made according to the invention, and FIG. 9 is a fragmentary side elevational view of one of the dough hooks of the type illustrated in FIG. 8.

As shown, the improved dough hook comprises a hub 10 having a bore 12 adapted to receive the drive spindle of an electric mixer. Below the hub 10 there is a circular dough-intercepting flange 14, and depending from the hub 10 and flange 14 is a hook 16. The hook 16, in accordance with the invention, has a square cross-section, as seen in FIGS. 6 and 7.

According to the invention, on opposite sides of the hook 16 are angularly-disposed blades 18 which are attached to the flange 14 and to the hook, the blades being sloped in a manner to push downward the dough which is being worked, as it tends to climb up the hook. The direction of rotation is indicated by the arrows in FIGS. 1 and 2.

Another embodiment of the invention is illustrated in FIG. 3, which shows a dough hook similar to that already described except that the top horizontal flange 14a has a butterfly shape, due to cut-out spaces 20.

Still another embodiment of the invention is illustrated in FIG. 4, wherein the dough hook is similar to that of FIG. 3 but has a modified, butterfly-shaped flange 14b with cut-out spaces 20b which are smaller than the spaces 20.

Yet another embodiment of the invention is illustrated in FIG. 5, wherein blades 18c are supported by the hook 16c and the hub 10c. The dough hook in FIG. 5 does not have a top intercepter flange, but instead the blades 18c act to push the dough downward and at the same time to knead it.

The above-described dough hooks, of the kind having dough-depressing blades, can be used either singly or else in pairs. The use of two such dough hooks, having dough-depressing blades provided in pairs, is illustrated in FIGS. 8 and 9 which reveal the working parts of a two-spindle planetary or orbital mixer-kneader made in accordance with the invention.

Referring first to FIG. 8, the mixer-kneader device of the invention comprises a power unit such as an electric motor 30 having a drive spindle 32 which can be provided with a worm 34. Meshing with the worm 34 is a worm wheel 36 carried by a vertical shaft 38 at the lower end of which there is rigidly secured a rotary head or bearing member 40. The member 40 has, at two opposite extremities, bearing portions 42, 44 which can be bushed, and which carry spindles 46, 48 provided with pinions 50, 52 respectively. The pinions 50, 52 mesh with internal teeth of a ring gear 54 which is fixedly mounted in the machine.

At their lower ends, the spindles 46, 48 have transverse drive pins 56, 58 adapted to be accommodated in L-shaped slots 60, 62 of hubs 64, 66 which have flanges 65, 67 respectively and which mount dough hooks 68, 70.

As provided by the invention, the hubs 64, 66 also have short deflector or depress blades 72, 74 at one pair of corresponding sides, and longer depress blades 76, 78 at the other pair or corresponding sides. The blades 72–78 are angularly disposed with respect to each other and with respect to the axes of the hooks 68, 70 as can be seen in FIGS. 8 and 9.

The directions of rotation of the hooks 68, 70 are the same, and are indicated by the arrows 80, 82 in FIG. 8. For such rotation, the rotary head 40 is driven in the direction of the arrow 84, as will be understood.

In FIG. 8, broken outlines 86, 88 indicate the relative positions of sets of the blades 72, 78, (one long and one short) for those two relative rotative positions of the spindles 46, 48 which bring the sets of blades closest together. As viewed in the figure, such juxtaposition at the lines 86, 88 will be achieved by approximately a 90° rotation of the hooks 68, 70 in a direction either opposite to that indicated by the arrows 80, 82, for example, or else the same as indicated by the arrows.

This represents an important feature of the invention, inasmuch as for such juxtaposition of the deflector blades the mass of dough which is disposed between them will be shifted downward by each such blade, as the blades pass each other going in opposite directions.

I have found that such action in pushing down the mass of dough is extremely effective, and keeps the hubs 64, 66 relatively free of dough even when large batches are being handled. Moreover, the opposite movements of the blades at the places 86, 88 indicated in FIG. 8 result in an advantageous shearing or pulling action of the dough, which is extremely effective in quickly kneading it and developing the gluten into a rubbery condition. That is, each time that the deflector blades 72–78 bypass each other, the dough is pushed downward and at the same time is stretched, the latter characterizing the kneading process. This action occurs because the adjacent or facing portions of the dough hooks at any moment are actually traveling in opposite directions, even though the hooks themselves turn about their axes in the same directions.

Stated another way, the central portions of the batch of dough are, during the said stretching, being pushed and pulled in a plurality of different, opposite directions extending generally laterally of the axis of the bowl 90, and the central displaced batch portions are repeatedly being replaced by outer portions of the batch, which move inward due to the downward movement of the dough as effected by the slopes of the blades 72-78. This explains the effectiveness of the method of mixing, according to the invention. Such organization represents an advantageous aspect of the invention.

Additionally, the like-directions of rotation of the dough hooks 68, 70 is effected by the very simple gear drive, comprising the pinions 50, 52 and the ring gear 54 in conjunction with the rotary head 40 and its power source. The gearing is thus seen to be especially simple and at the same time rigid and powerful to enable the dough hooks 68, 70 to capably handle large batches of dough.

The mixer has a suitable mixing bowl 90 which can be of metal or glass and is so shaped as to cooperate with the shaping of the dough hooks 68, 70 whereby the batch of dough is readily worked with the least expenditure of drive power and wasted motion.

The dough hook 16 illustrated in FIGS. 1 and 2 can be applied to either of the spindles 46, 48 and when it is the flange 14 will extend closely adjacent the other or free spindle, which is not carrying any implement. This is an advantageous safety feature, inasmuch as it ensures that no other attachment or implement can be applied to the unused spindle. Such application, if permitted, could cause interference and damage to the machine as well as injury to the user. A flange such as the flange 14 of the dough hook shown in FIG. 2 can be provided advantageously on a flat-type beater, and the same safety feature will then ensue because the flange will prevent any other attachment from being applied to the remaining free spindle that is not carrying the flat-type beater.

Further, spiral wire whips can be so formed that their wire elements have high shoulder portions which will then perform the same safety function as the circular flange 14 of the dough hook 16. If such a wire whip with spiral wires or elements and high shoulders is applied to one of the spindles 46, 48 it will prevent the application of any other implement on the remaining free spindle, and here again there is had the important safety advantage of preventing injury to a user or damage to the machine.

Two of the hooks 16, for example, could not be simultaneously placed on the spindles 46, 48 to interfere or conflict with each other and cause damage, in view of the presence of the large-diameter circular flanges 14. Only the specially-designed interfitting dough hooks 68, 70 can be simultaneously placed on the two spindles 46, 48 and cooperate to effect the mixing and kneading of the dough. By this organization the operation of the mixer is foolproof, and damage is prevented to it as well as injury to operating personnel.

The hooks 68, 70 have laterally-offset portions 92, 94 which are complementary in providing clearance between the hooks during the like-direction, same-speed turning of the same. Part of the clearance space formed by the hook portion 92 can be occupied on occasion by the hook portion 94, and vice versa. As seen in FIG. 9, the blades 74, 78 lie in planes which are perpendicular to the plane of the hook 70.

Also, according to the invention, one of the hooks 68, 70—specifically the hook 68 can have a lateral extension 96 which extends closely adjacent the inner bowl surface and constitutes an advantageous bowl scraper, which effectively eliminates most of the bowl scraping that was previously done by hand. Only one hook need have the bowl scraper portion 96, thus lightening the loading of the motor 30 while at the same time effectively moving the dough from the bowl wall.

It will now be seen from the foregoing that I have provided a novel and advantageous, two-spindle planetary mixer-kneader machine and cooperable, flat-sided dough hooks equipped with depress blades, all for the purpose of facilitating the mixing, kneading and handling of dough in the making of bread.

Variations and modifications are possible without departing from the spirit of the invention.

I claim:

1. A planetary kitchen mixer-kneader, comprising in combination:
    (a) a rotary head mounted for rotation about a vertical axis,
    (b) a fixedly mounted gear having teeth, and having the same axis as the vertical axis of the rotary head,
    (c) power means including gearing, for rotating said rotary head,
    (d) a pair of vertical spindles turnably mounted in the rotary head and having pinions meshing with the teeth of the fixed gear to effect like-direction turning of the spindles as the head is rotatably driven,
    (e) a pair of dough hooks respectively carried by said spindles, and
    (f) a mixing bowl disposed about said dough hooks, said hooks traversing the inside surface of the bowl in an orbital path as the head turns, and said hooks having laterally-offset portions which are complementary in providing clearance between the hooks during the like-direction turning of the latter.

2. The invention as defined in claim 1, wherein:
    (a) said dough hooks have sloped deflector blades which are so disposed angularly that, during rotation of the hooks, the blades present working surfaces which exert a downward camming force on the dough, said blades being thereby cooperable with each other to push a dough mixture downward as the hooks rotate.

3. The invention as defined in claim 2, wherein:
    (a) each hook has a short deflector blade and a long deflector blade respectively disposed on its opposite sides.

4. The invention as defined in claim 2, wherein:
    (a) each hook has a flange disposed above and connected to its deflector blades.

5. The invention as defined in claim 2, wherein:
    (a) the deflector blades lie in planes which are perpendicular to the planes of the dough hooks respectively.

6. The invention as defined in claim 1, wherein:
    (a) the laterally-offset portion of at least one of the dough hooks can extend closely adjacent a side wall of the mixing bowl during the movement of the said one hook.

7. A kitchen mixer-kneader as defined in claim 1, wherein:

(a) one of said hooks has a laterally-offset portion extending closely adjacent to and along the wall of the bowl to effect a scraping of dough off said wall.

8. An anti-climb dough hook attachment for electric mixers, comprising in combination:
   (a) a hub adapted to be secured to the spindle of a mixer,
   (b) a hook carried by and depending from said hub, and
   (c) a pair of angularly-disposed blades having opposite flat sides which are disposed in oblique planes with respect to the axis of the hook, said blades being rigid with the hook and hub, and depending from the latter,
   (d) said blades being disposed on opposite sides of the hook and having an inclination which tends to force dough downwardly of the hook as it rotates about its axis.

9. An anti-climb dough hook attachment as defined in claim 8, wherein:
   (a) said hook lies in a single plane,
   (b) said blades being disposed in planes at right angles to the single plane of the dough hook.

* * * * *